United States Patent
Raghunathan et al.

(10) Patent No.: US 11,704,447 B2
(45) Date of Patent: Jul. 18, 2023

(54) METHOD AND SYSTEM FOR CIRCUITING IN HEAT EXCHANGERS

(71) Applicant: Mitsubishi Electric Research Laboratories, Inc., Cambridge, MA (US)

(72) Inventors: Arvind Raghunathan, Medford, MA (US); Christopher Laughman, Waltham, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 458 days.

(21) Appl. No.: 16/299,581

(22) Filed: Mar. 12, 2019

(65) Prior Publication Data
US 2020/0293625 A1 Sep. 17, 2020

(51) Int. Cl.
*G06F 30/00* (2020.01)
*F28F 99/00* (2006.01)
(Continued)

(52) U.S. Cl.
CPC ............. *G06F 30/00* (2020.01); *F28F 99/00* (2013.01); *F28F 2200/00* (2013.01); *G06F 2111/04* (2020.01); *G06N 20/10* (2019.01)

(58) Field of Classification Search
CPC ...... G06F 30/00; G06F 2111/04; F28F 99/00; F28F 2200/00; G06N 20/10
See application file for complete search history.

(56) References Cited

U.S. PATENT DOCUMENTS 9,606,594 B2 * 3/2017 Noureldin ............... G05B 17/00
2011/0272117 A1 * 11/2011 Hamstra ............. F24D 19/1048
165/185
(Continued)

FOREIGN PATENT DOCUMENTS

CN 105509537 A * 4/2016 ............... A61F 7/00
CN 109269037 A * 1/2019
(Continued)

OTHER PUBLICATIONS

Christian Tjandraatmadja; "Decision Diagram Relaxations for Integer Programming"; (Year: 2018).*
(Continued)

*Primary Examiner* — Rehana Perveen
*Assistant Examiner* — Nupur Debnath
(74) *Attorney, Agent, or Firm* — Gennadiy Vinokur; Hironori Tsukamoto

(57) ABSTRACT

A system for designing a circuitry configuration of heat-exchanger units includes an interface to acquire design parameters the heat-exchanger units, a memory to store computer-executable programs including a relaxed decision diagram formation module, and a processor, in connection with the memory, configured to perform the computer-executable programs. The computer-executable programs include steps of providing a configuration of the heat-exchanger units, providing the design parameters of the heat-exchanger units acquired via the interface, generating a relaxed decision diagram based on the design parameters, creating constraints with respect to connections of the heat-exchanger units according to the relaxed decision diagram, and generating feasible configurations of the heat-exchanger units by a mixed-integer-programing method using the constraints.

25 Claims, 16 Drawing Sheets

(51) Int. Cl.
*G06N 20/10* (2019.01)
*G06F 111/04* (2020.01)

(56) References Cited

U.S. PATENT DOCUMENTS

| | | | | |
|---|---|---|---|---|
| 2015/0079490 | A1* | 3/2015 | Kemmer | H01M 8/04126 429/434 |
| 2018/0284758 | A1* | 10/2018 | Cella | G06N 3/0472 |
| 2019/0024573 | A1* | 1/2019 | Tapley | F01P 7/10 |
| 2019/0383509 | A1* | 12/2019 | Takagi | F25B 1/00 |

FOREIGN PATENT DOCUMENTS

| | | | | |
|---|---|---|---|---|
| JP | 2017062836 | A * | 3/2017 | G06F 1/26 |
| JP | 2018162964 | A * | 10/2018 | |
| WO | WO-2018211596 | A1 * | 11/2018 | H02P 21/34 |

OTHER PUBLICATIONS

Chang H. Oh, Eung S. Kim; "Design option of Heat Exchanger for the next generation Nuclear Plant" (Year: 2008).*

Sergey Levine; Reinforcement Learning and Control as Probabilistic Inference: Tutorial and Review; UC Berkeley (Year: 2018).*

Angelo Ciccazzo, Gianni Di Pillo, Vittorio Latorre; "Support vector machines for surrogate modeling of electronic circuits"; Neural Comput & Applic (Year: 2013).*

Natchanon Angsutorn et al.; Heat Exchanger Network Synthesis using MINLP Stage-wise Model with Pinch Analysis and Relaxation; Proceedings of the 24th European Symposium on Computer Aided Process Engineering (Year: 2014).*

Dimitrios Letsios et al. "Reprint of: Heuristics with performance guarantees for the minimum number of matches problem in heat recovery network design" (Year: 2018).*

Margarita P. Castro et al.; "Relaxed Decision Diagrams for Cost-Optimal Classical Planning" (Year: 2018).*

Luis Carlos Castillo Martinez et al.; "Plate-fin and Tube Heat Exchangers Refrigerant Circuiting Optimization in Vapor Compression Refrigeration Systems"; International Refrigeration and Air Conditioning Conference at Purdue, Jul. 12-15, 2010 (Year: 2010).*

Zhenning Li et al.; "Tube-fin Heat Exchanger Circuitry Optimization for Improved Performance Under Frosting Conditions"; Proceedings of the 13th International Modelica Conference Mar. 4-6, 2019, Regensburg, Germany (Year: 2019).*

Piotr A. Domanski et al.; "An Optimized Design of Finned-Tube Evaporators Using the Learnable Evolution Model"; vol. 10, No. 2; HVAC&R Research (Year: 2004).*

Ploskas et al. "Optimization of Circuitry arrangements for heat exchangers using derivative free optimization," arxiv.org, Cornell University Library, 201 Odin Library Cornell University Ithaca, NY, 14853, May 30, 2017.

Bergman et al., "On Finding the Optimal BDD Relaxation," May 31, 2017, International Conference on Financial Cryptography and Data Security. Lecture notes in Computer Science., Springer Berlin, Heidelberg., pp. 41-50.

Tjandraatmadja., "Decision Diagram Relaxations for Integer Programming," Dissertation Submitted in partial fulfillment of the requirements for degree., Algorithms, Combinatorics and Optimization., Apr. 26, 2018, pp. 1-119.

* cited by examiner $$\sum_{a \in A_{s,i}^{in}} x_a = \sum_{a \in A_{s,i}^{out}} x_a, \qquad \forall s \in S, i \in \{1,\ldots,N\} \quad (2)$$

$$\sum_{a \in A_{s,i}^{in}: tail(a) \in S} x_a + \sum_{a \in A_{0,i}^{in}: tail(a)=0} x_a = \sum_{a \in A_{s,i}^{out}} x_a, \quad \forall s, \forall i = 2,\ldots,N \quad (3)$$

$$\sum_{i=1}^{N} \sum_{a \in A_{s,i}^{in}} x_a = 1, \qquad \forall s \in S \quad (4)$$

$$C_{lb} \leq \sum_{a \in \bigcup_{s \in S} A_{s,i}^{in}} x_a \leq C_{ub} \quad (5)$$

$$x_a \in \{0,1\}, \ a \in A(x), \ z_{a'} \in \mathbb{Z}, \ \forall a' \in A(z). \quad (6)$$

- $N$: the number of layers in the decision diagram
- $L_i$: represents the $i$-th layer in the decision diagram, where $i = 1, \ldots, N$
- $s$: super-nodes (not including $t$-node)
- $S$: set of super-nodes
- $r, t$: the root and terminal nodes in the decision diagram
- $(s, i)$ or $(0, i)$: node in layer $i$ of decision diagram
- $a$: arcs in the decision diagram
- $head(a)$ ($tail(a)$): starting (ending) node of the arc in the decision diagram
- $A_{s,i}^{in}$ ($A_{s,i}^{out}$): set of input arcs to (output arcs from) super-node $s$ in $L_i$
- $A_{0,i}^{in}$ ($A_{0,i}^{out}$): set of input arcs to (output arcs from) 0 in $L_i$
- $x_a \in \{0,1\}$ for $a \in A(x) := \bigcup_{i=1, s \in S}^{N}(A_{s,i}^{in} \cup A_{0,i}^{in})$: binary variables encoding flow on the arcs between $s, s' \in S$ and flow between $s \in S$ and 0
- $z_a \in \{0,1,\ldots\}$ for $a \in A(z) := \bigcup_{i=2}^{N} A_{0,i}^{in}$: integer variables encoding flow on the arcs between 0 in successive layers
- $C_{lb}$: the minimum number of circuits
- $C_{ub}$: the maximum number of circuits $\mathbb{Z}$ - set of integers

FIG. 6

| # of tubes | Problem size of the formulation proposed in [1] | Problem size of the proposed formulation | Reduction in problem size (%) |
|---|---|---|---|
| 16 | 263 × 120 | 471 × 82 | -22% |
| 24 | 4,107 × 270 | 1,619 × 170 | 76% |
| 32 | 65,551 × 406 | 3,887 × 290 | 97% |
| 40 | 1,048,595 × 780 | 7,650 × 442 | 100% |
| 128 | - | 258,239 × 4,226 | - |

Reduction in the problem size of the proposed decision diagram formulation compared to the formulation proposed in [1]

FIG. 8

Computational results for $Q$ and $Q/\Delta P$ optimization

| # of tubes | Baseline $Q$ | Optimized $Q$ | Improvement (%) | Baseline $Q/\Delta P$ | Optimized $Q/\Delta P$ | Improvement (%) |
|---|---|---|---|---|---|---|
| 4 | 1,388 | 1,754 | 26% | 3,727 | 3,727 | 0% |
| 8 | 1,884 | 2,189 | 16% | 2,640 | 14,664 | 455% |
| 16 | 2,170 | 2,391 | 10% | 1,068 | 51,219 | 2,971% |
| 24 | 2,249 | 2,353 | 5% | 1,162 | 110,289 | 9,391% |
| 32 | 2,234 | 2,269 | 2% | 854 | 156,181 | 18,188% |
| 40 | 2,154 | 2,255 | 5% | 682 | 193,654 | 30,541% |
| 128 | 9,094 | 9,790 | 1% | 448 | 1,518 | 239% |

FIG. 9

| # of tubes | MIP size | CPLEX time to generate 10,000 feasible solutions (s) | Branching algorithm to generate 10,000 feasible solutions (s) |
|---|---|---|---|
| 24 | 1,619x170 | 39 | 2 |
| 40 | 7,659x442 | 172 | 10 |
| 128 | 258,239x4,226 | 10,000 | 100 |

FIG. 13

$$\max \{\text{linear or nonlinear surrogate model of } (C, L, D, R)\} \quad (1)$$
$$\text{s.t.} \quad C_{lb} \leq C \leq C_{ub} \quad (2)$$
$$L_{lb} \leq L \leq L_{ub} \quad (3)$$
$$D \leq D_{ub} \quad (4)$$
$$R_{lb} \leq R \leq R_{ub} \quad (5)$$

$C$: the number of circuits
$C_{lb}$: the minimum number of circuits
$C_{ub}$: the maximum number of circuits
$L$: the length of circuits
$L_{lb}$: the minimum length of circuits
$L_{ub}$: the maximum length of circuits
$D$: the distance of connected tubes
$D_{ub}$: the maximum distance of connected tubes
$R$: the number of crossovers between columns
$R_{lb}$: the minimum number of crossovers between columns
$R_{ub}$: the maximum number of crossovers between columns

FIG. 14

METHOD AND SYSTEM FOR CIRCUITING IN HEAT EXCHANGERS

FIELD OF THE INVENTION

This invention is related to a method and a system for circuiting heat exchanger design.

BACKGROUND & PRIOR ART

Heat exchanger performance is important in many systems, ranging from heating and air-conditioning systems that are widely used in residential and commercial applications, to plant operation for process industries. Depending upon the application of the heat exchanger, various shapes and configurations are manufactured for the components of the heat exchanger. The most common configuration used in heating and air-conditioning applications is that of the cross flow fin-and-tube type. In this type, a refrigerant fluid flows through a set of pipes and moist air flows across a possibly enhanced surface on the other side of the pipe, allowing thermal energy to be transferred between the air and the refrigerant.

Heat exchanger performance improvement can be achieved by evaluating a number of different metrics; these typically include maximization of heating or cooling capacity, size reduction, component material reduction, manufacturing cost reduction, reduction of pumping power, or a combination of these metrics. While the concept of some of these metrics is straightforward (e.g., size reduction and manufacturing cost reduction), the heat capacity is influenced by various parameters (like the geometry of the heat exchanger and the inlet conditions) and the dependence of the heat exchanger performance on the input is highly discontinuous and nonlinear.

Systematic optimization of heat exchangers has been a long-standing research topic. It is a particularly challenging task mainly for the following reasons: (i) the search space is enormous making exhaustive search algorithms impractical for heat exchangers with a large number of tubes, and (ii) there is a highly discontinuous and nonlinear relationship between the circuitry design and the heat exchanger performance.

There still remains a need to develop computationally efficient algorithms for finding the optimized circuitry designs for heat exchangers.

SUMMARY

The circuitry design of a heat exchanger has a significant impact on its performance. In accordance with some embodiments of the present invention, the performance of a heat exchanger can be improved by developing an approach to find circuitry designs that improve performance. This task is difficult because the number of circuitry candidates is enormous and the dependence of the heat exchanger performance on the input (configuration) is highly discontinuous and nonlinear.

Some embodiments of the present invention are based on the realization that a system for designing a circuitry configuration of heat-exchanger units includes an interface to acquire design parameters the heat-exchanger units; memory to store computer-executable programs including a relaxed decision diagram formation module; a processor, in connection with the memory, configured to perform the computer-executable programs, wherein the computer-executable programs comprising steps of: providing a configuration of the heat-exchanger units; providing the design parameters of the heat-exchanger units acquired via the interface; generating a relaxed decision diagram based on the design parameters; creating constraints with respect to connections of the heat-exchanger units according to the relaxed decision diagram; and generating feasible configurations of the heat-exchanger units by a mixed-integer-programing method using the constraints.

Some embodiments of the invention are based on the realization that the space of feasible circuitry configurations that are modeled by the relaxed decision diagram can be searched in a computational efficient manner by constructing surrogate models. The constructed surrogate models are optimized using nonlinear mixed integer programming methods to identify promising circuitry configurations.

Some embodiments of the invention are based on the realization that the surrogate models can be constructed using support vector machines wherein a linear kernel is used or a nonlinear kernel such as a radial basis function is used.

Some embodiments of the invention are based on the realization that the surrogate models can be constructed by learning parameters of a neural networks using reinforcement learning.

Further, in accordance with some embodiments of the present invention, a method for designing a circuitry configuration of heat-exchanger units can improve the efficiency of the heat-exchanger units. In this case, the method includes steps of providing a configuration of the heat-exchanger units; providing design parameters of the heat-exchanger units; generating a relaxed decision diagram based on the design parameters; creating constraints with respect to connections of the heat-exchanger units according to the relaxed decision diagram; and generating feasible configurations of the heat-exchanger units by a mixed-integer-programing method using the constraints.

For instance, according to embodiments of the present invention, a novel decision diagram formulation (method/system) produces configurations with 9% higher, on average, heat capacity than the baseline configuration. exchangers provide a mechanism for transferring heat between two fluids. This can also be effective to reduce significant amounts of computation power and the power consumption of computers (processors).

Some embodiments of the present invention provide a method and a system for determining a circuitry configuration that optimizes the heat exchanger performance. The circuitry configuration includes the circuitry design along with identifying the tubes that are inlet and outlet tubes. In some cases, each of the tubes can be referred to as heat exchanger units, and the circuitry configuration can be referred to as a circuitry configuration of heat-exchanger units. Fin-tube heat exchangers are typically constructed by first stacking layers of aluminum fins together that contain preformed holes, and then press-fitting copper tubes into each set of aligned holes. The copper tubes are typically pre-bent into a U shape before insertion, so that two holes are filled at one time. After all of the tubes are inserted into the set of aluminum fins, the heat exchanger is flipped over and the other ends of the copper tubes are connected in the desired circuitry pattern.

The embodiments of the invention provide a providing a novel relaxed decision diagram formulation for the heat exchanger circuitry optimization problem.

According to embodiments of the present invention, the computation load can be greatly reduced by providing substantially reduced number of feasible configurations of the heat-exchanger units by performing the computer-executable programs including a relaxed decision diagram formulation module, while designing the energy efficient circuitry configurations of heat-exchanger units.

Accordingly, the embodiments of the present invention can reduce central processing unit (CPU or processor) usage, power consumption and/or network bandwidths usages. This can provide the improvement of the functions of the processor (CPU).

BRIEF DESCRIPTION OF FIGURES

The presently disclosed embodiments will be further explained with reference to the attached drawings. The drawings shown are not necessarily to scale, with emphasis instead generally being placed upon illustrating the principles of the presently disclosed embodiments.

FIG. 6 is the mixed integer programming formulation according to embodiments of the invention;

FIG. 8 is a table depicting the problem size reduction obtained from the relaxed decision diagram formulation according to embodiments of the invention;

FIG. 9 is a table depicting the improvement in objective from using the embodiments of the invention;

FIG. 13 is a table depicting the reduction in computational time over a commercial mixed integer programming solver according to embodiments of the invention;

FIG. 14 is the optimization formulation used in conjunction with surrogate models according to embodiments of the invention.

Figure 1A:
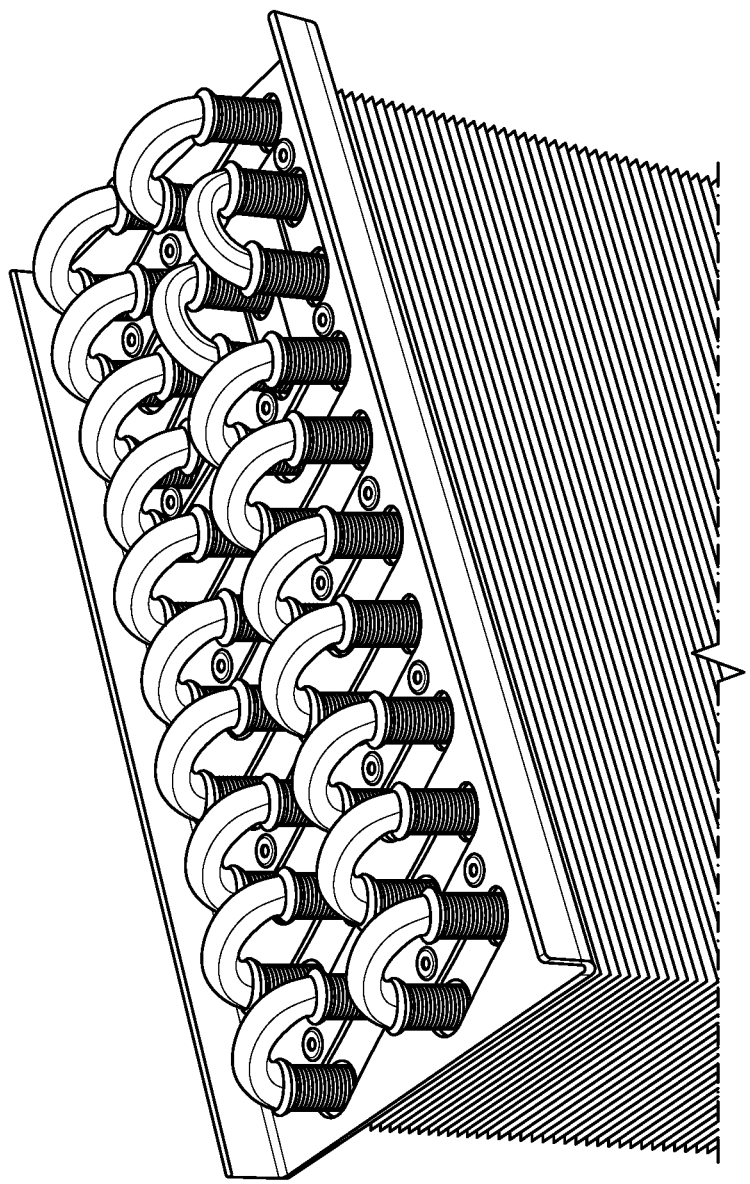
FIG. 1A is picture illustrating the circuitry for a representative heat exchanger.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

A picture illustrating the circuitry for a representative heat exchanger is illustrated in FIG. 1A. Such heat exchangers are typically constructed by first stacking layers of aluminum fins together that contain preformed holes, and then press-fitting copper tubes into each set of aligned holes. The copper tubes are typically pre-bent into a U shape before insertion, so that two holes are filled at one time. After all of the tubes are inserted into the set of aluminum fins, the heat exchanger is flipped over and the other ends of the copper tubes are connected in the desired circuitry pattern.

A circuit is a set of tubes through which the refrigerant flows from inlet to outlet. In some cases, a minimum unit of a heat exchanger unit can be a single tube having a bent portion connected an inlet and an outlet, and thus the single tube may be referred to as a heat exchanger unit. A circuitry configuration is a collection of circuits than satisfy a set of manufacturing constraints so that configuration can be manufactured as a heat exchanger. A set of realistic manufacturing constraints are imposed on the connections of the tubes: (i) adjacent pairs of tubes in each column, starting with the bottom tube (bottom unit), are always connected (this constraint is imposed by the manufacturing process since one set of bends on the far end are applied to the tubes before they are inserted into the fins), (ii) the connections on the far end cannot be across rows unless they are at the edge of the coil, (iii) plugged tubes, i.e., tubes without connections, are not allowed, (iv) inlets and outlets must always be located at the near end, and (v) merges and splits are not allowed. The example in FIG. 1B depicts a circuitry configuration with two circuits.

Figure 1B:
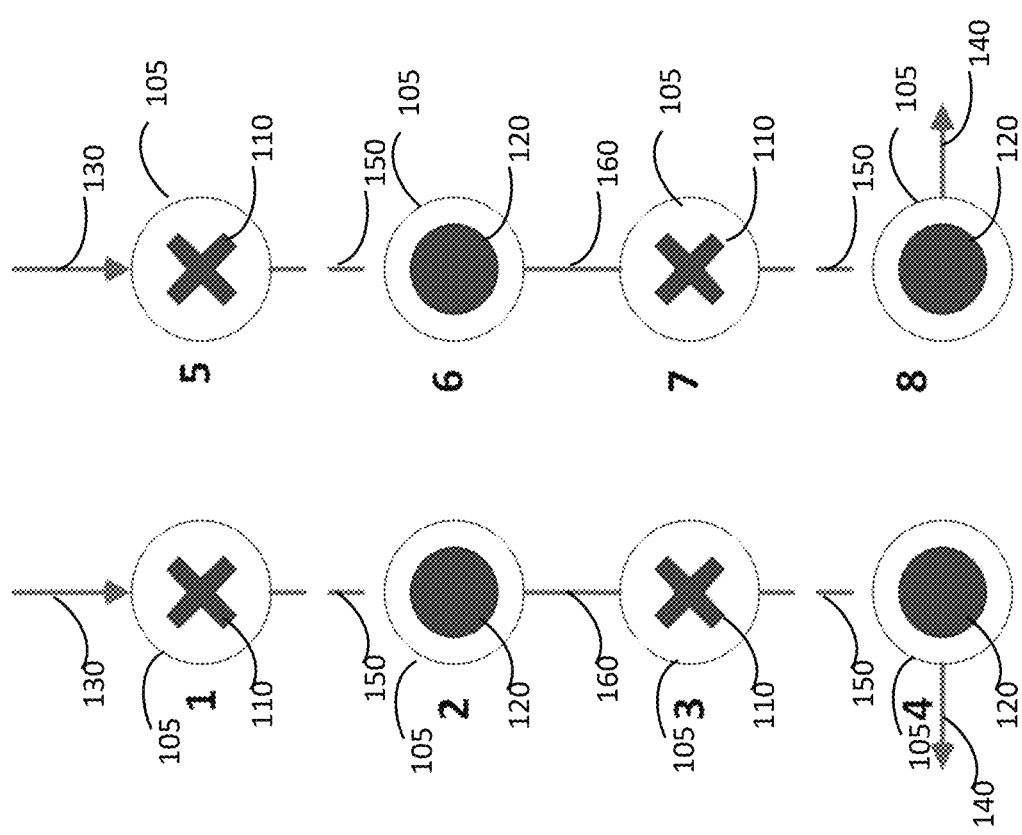
FIG. 1B is a schematic of the circuitry configuration for a heat exchanger of eight tubes.

By way of example, FIG. 1B illustrates an example of a circuitry configuration for a heat exchanger (a 8-tube heat exchanger) consisting of eight tubes 105, in which each of the tubes 105 is numbered 1 through 8. A crossed sign 110 inside a circle indicates that the refrigerant flows from the front side into the back side of the page, while a dotted sign 120 indicates that the refrigerant flows out of the page. There are two types of connections: (i) a connection at the far end of the tubes, and (ii) a connection at the front end of the tubes. Therefore, a dotted line 150 between two tubes represents a connection on the far end, while a solid line 160 represents a connection on the front end of the tubes. In this example, the pairs of tubes 1-2, 3-4, 5-6 and 7-8 are the pre-connected tubes (i.e. tubes with bends on the far end of the coil).

Further, tubes 1 and 5 involve inlet streams 130, while tubes 4 and 8 involve outlet streams 140. A circuit is a set of pipes through which the refrigerant flows from inlet to outlet. The example in FIG. 1 depicts a circuitry configuration with two circuits.

While the current picture only illustrates a very simple circuiting arrangement, many different connections can potentially be made between the tubes.

Figures 2A, 2B:
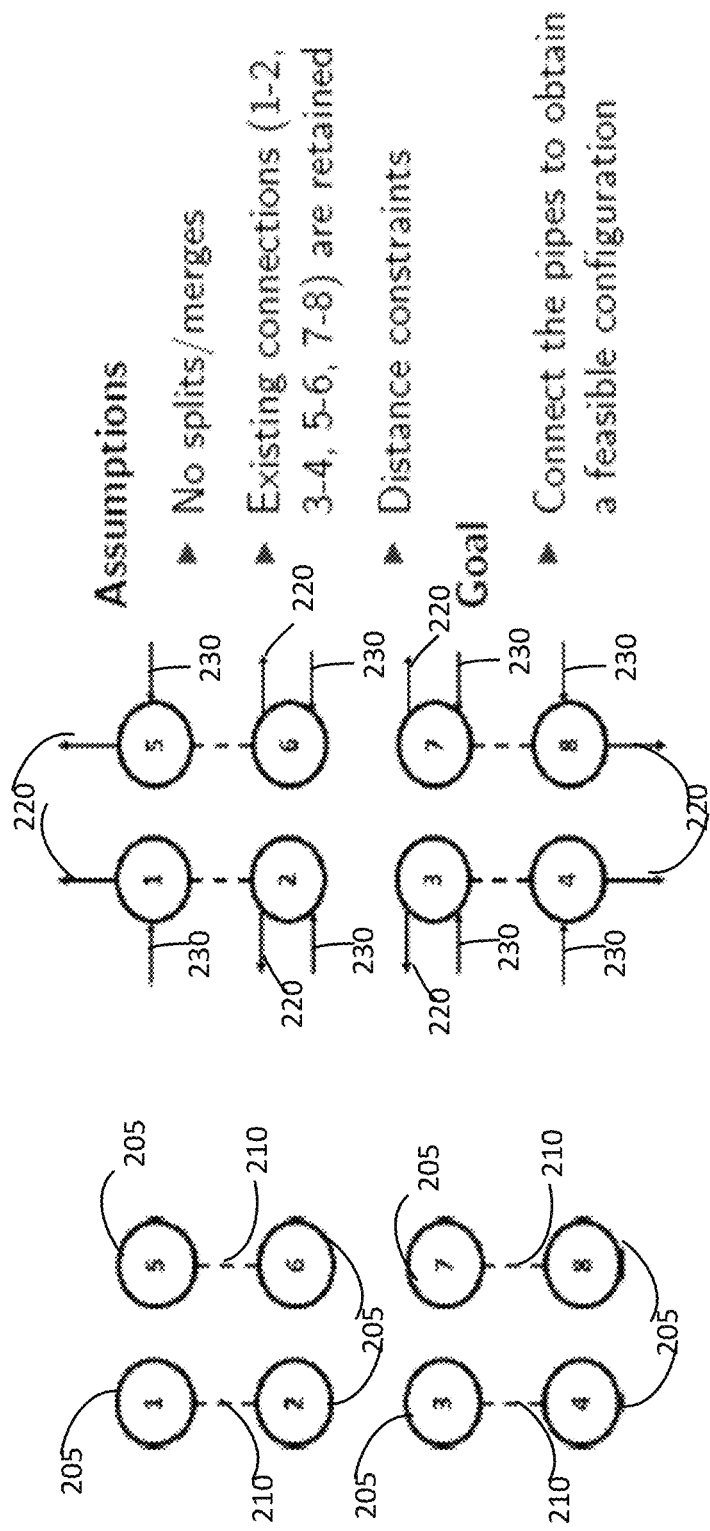
FIG. 2A is a schematic representing the existing connections in a heat exchanger of eight tubes and the possible connections.
FIG. 2B is a schematic representing the existing connections in the heat exchanger of FIG. 2A and the possible connections.

By way of example, FIG. 2A and FIG. 2B are schematic representations of the existing connections in an 8-tube heat exchanger and all the possible inlet and outlet streams for each tube. The tubes 205 are numbered from 1 through 8. The existing connections at the far end are indicated by dotted lines 210. The existing connections are between tubes 1-2, 3-4, 5-6 and 7-8. The objective of the circuiting is to find possible connections between the existing pairs of tubes so as that the fluid enters a tube and exits from another tube without any splits or merges. The possible tubes where inlet streams 230 are connected can be any of the pipes 1-8. The possible tubes where outlet streams 220 can be connected can be any of the tubes 1-8. However, to obtain a feasible configuration inlet and outlet cannot be the same tube. Further, a pair of tubes that are connected at the far end should not both be connected to inlet streams or outlet streams. In addition, splits and merges are to avoided.

Figures 3A, 3B:
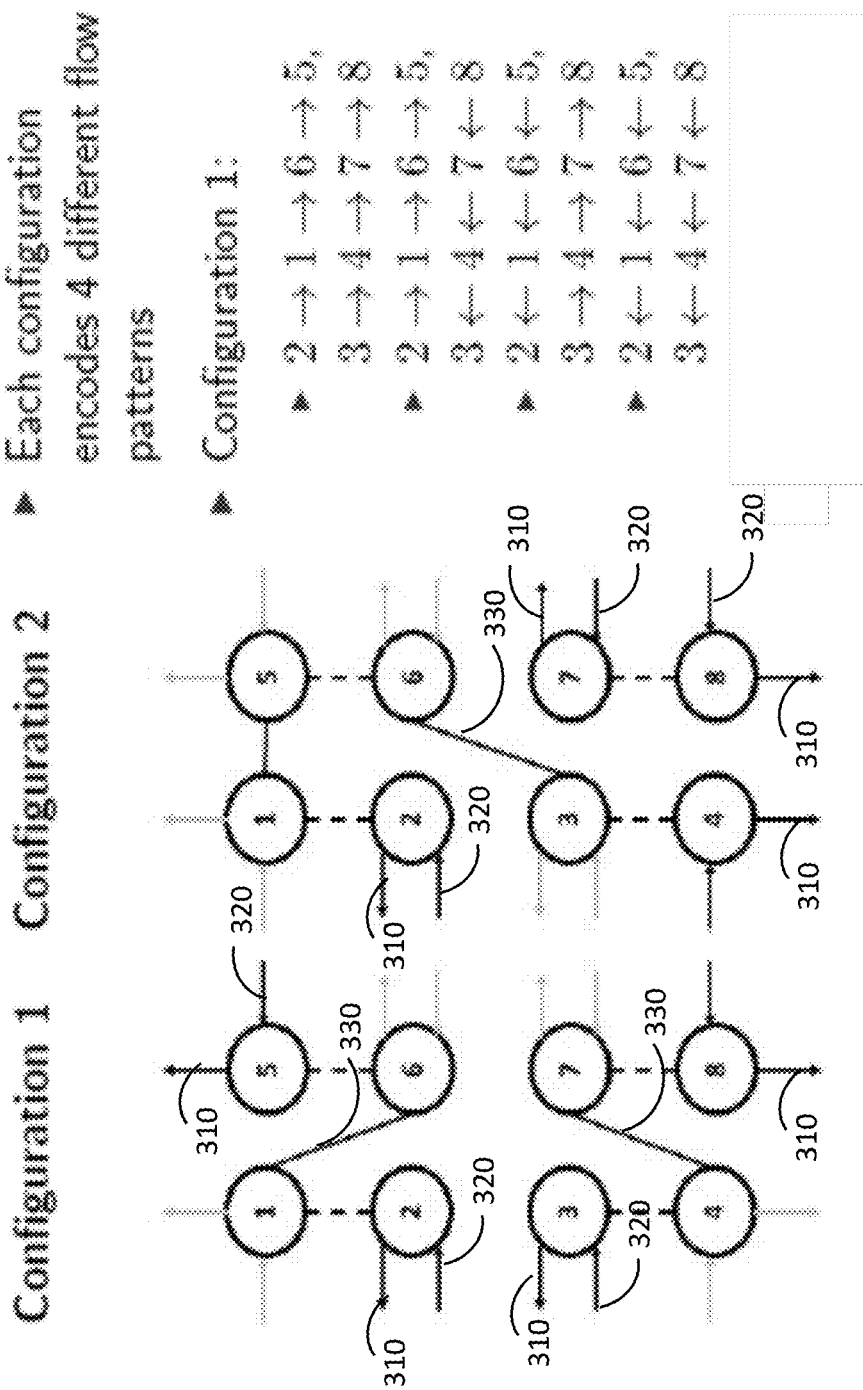
FIG. 3A is a schematic of showing one circuit in heat exchanger of eight tubes.
FIG. 3B is a schematic of showing another circuit in heat exchanger of eight tubes.

By way of example, FIG. 3A and FIG. 3B show schematic representations of two possible configurations obtained by connections satisfying the stipulations. Configuration 1 shows a possible circuitry where tubes 1 and 6 are connected 330 and tubes 4 and 7 are connected 330. Then the two circuits are collection of pipes {2,1,6,5} and {3,4,7,8}. The fluid can flow either direction as in 2→1→6→5 or 5→6→1→2 or 3→4→7→8 or 8→7→4→3. In other words, the inlet tube 320 in the circuit {2,1,6,5} can be either tube 2 or tube 5 and correspondingly the outlet tube 310 in the circuit is tube 5 or tube 2. In circuit {3,4,7,8} the inlet 320 can be tube 3 or tube 8 and correspondingly the outlet tube 310 in the circuit is tube 8 or tube 3. So in this given pair of circuits there are a total of 4 different flow patterns can occur. Namely,

2→1→6→5, 3→4→7→8
2→1→6→5, 8→7→4→3
5→6→1→2, 3→4→7→8
5→6→1→2, 8→7→4→3

The tubes are listed in the sequence in which the fluid can possibly flow in one of the flow directions. Further, the designer may require design parameters that include some distance constraints, which need to be satisfied. Specifically, the design parameters are described below.

For instance, the distance between the existing tubes are known/provided ahead of time since the relative positions of the tubes are fixed. Based on this, the connection between tubes result in certain lengths. The designer requires that connections between 1-8 and 4-5 are avoided. The depicted configurations satisfy this.

The key realization in the invention is that pre-connected tubes (i.e., tube with bends on the far end of the coil) are treated as single entity (one heat exchanger unit), called super-nodes. Based on the manufacturing constraint outlined previously, the heat-exchanger circuitry configuration can be defined as:

(a) as a collection of paths involving super-nodes where each super-node occurs only once in a path;
(b) paths cover all super-nodes; and
(c) paths are super-node disjoint.

In one embodiment of the invention a relaxed decision diagram is provided to represent the set of all heat exchanger configurations. The diagram is relaxed since the requirements (a) and (c) are not modeled in the diagram. The relaxed decision diagram satisfies only a subset of constraints for feasible heat-exchanger circuitry.

Figure 4:
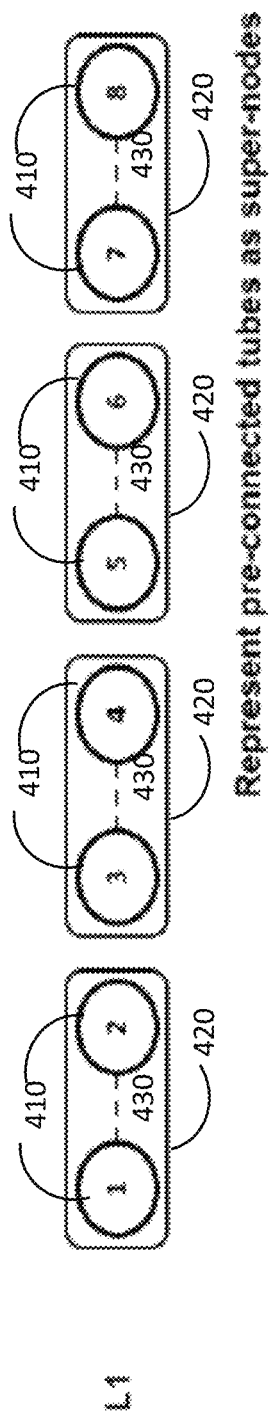
FIG. 4 is a schematic representing a layer of the relaxed decision diagram according to embodiments of the invention.

FIG. 4 illustrates a layer of the relaxed decision diagram according to embodiments of the invention. The tubes 410 in the heat exchanger numbered 1-8 with dotted lines 420 depicting the existing connections in the far-end. The tubes with existing connections are considered as a super-node 420 according to embodiments of this invention. In the depiction the super-nodes are 1-2, 3-4, 5-6 and 7-8.

Figure 5:
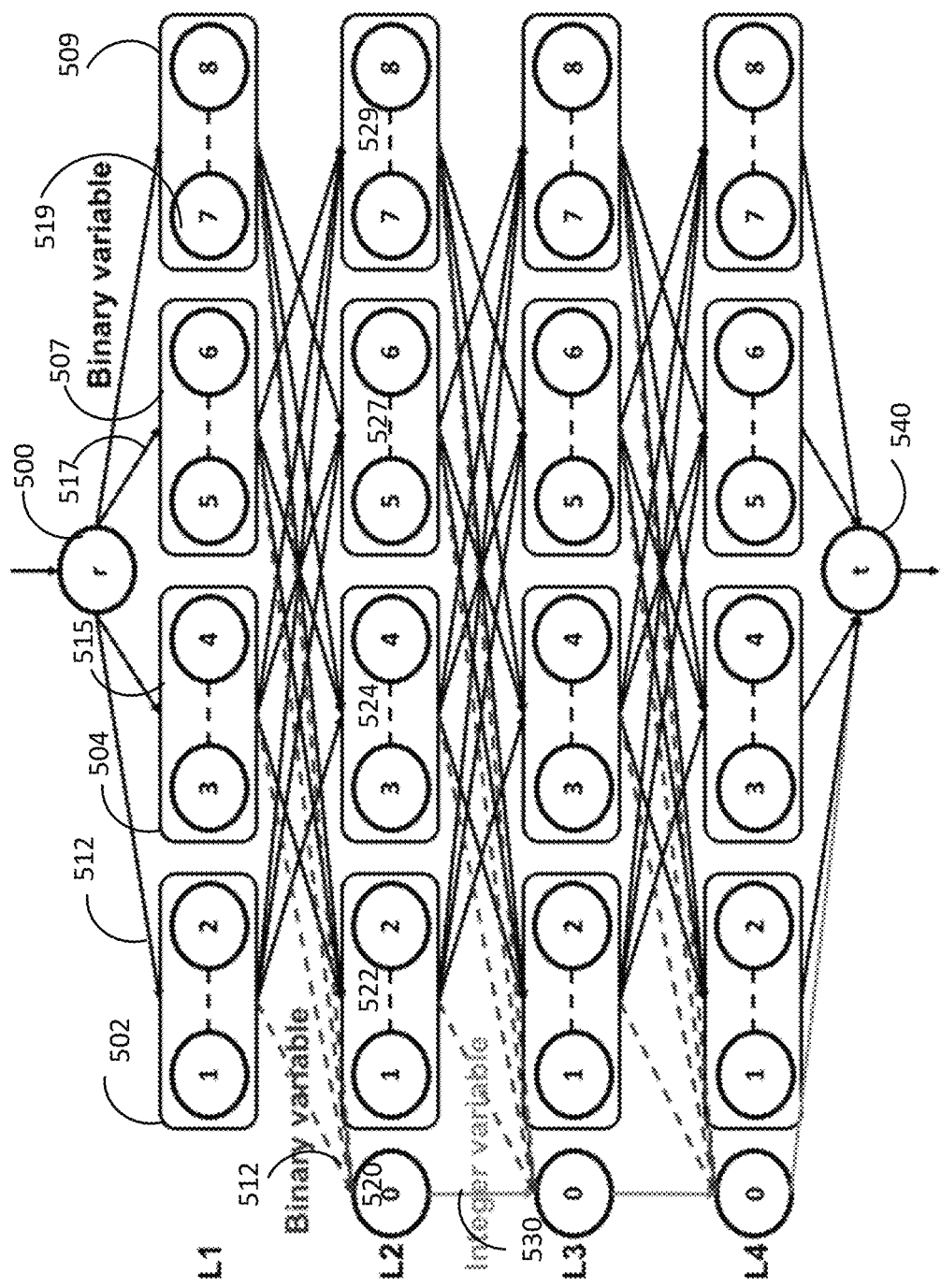
FIG. 5 is a schematic of the relaxed decision diagram according to embodiments of the invention.

FIG. 5 illustrates a relaxed decision diagram formulation for a heat exchanger with eight tubes according to embodiments of the invention. A description of the steps involved in the construction of a relaxed decision diagram follows. Suppose there are n tubes. The number of layers in the decision diagram is equal to $N=(n/2)$. The layers are indexed sequentially and every layer consists of the set of super-nodes 502, 504, 507, 509 which are the tubes with existing connections. In addition, a 0-node 520 is introduced into layers with index 2 and above. The 0-node represents the end of a circuit. Directed arcs are drawn between the nodes (collection of super-nodes and 0-node) of two successive layers. Root 500 and terminal 540 nodes are introduced that respectively connect to the first and last layers in the diagram. A path in the relaxed decision diagram is sequence of super-nodes starting from the root to the terminal where the super-nodes in the sequence have an arc in the relaxed decision diagram. In this representation, a path from the root to terminal can repeat super-nodes. For example, the path (r, 1-2, 3-4, 0, 0, t) is a path satisfying (a) while the path (r, 1-2, 3-4, 1-2, 3-4, t) is a path that does not satisfy (a). Additional constraints that ensures that the procedure identifies configurations satisfying the requirements (a)-(c). The constraints ensure that the identified path is indeed a circuit.

FIG. 6 presents the mixed integer programming model derived from the relaxed decision diagram formulation. Eq (2) in FIG. 3 is the flow balance for the super-nodes in all different levels, while Eq (3) is the flow balances for the 0-nodes. Eq (4) is imposed for each super-node and invalidates any repetition of each super-nodes, so there can be no cycles. Eq (5) sets a limit on the number of circuits in the circuitry configuration.

$$\max Q(x, z) \left( \text{or } \frac{Q(x, z)}{\Delta P(x, z)} \right) \quad (1)$$

$$\text{s.t.} \sum_{a \in A^{in}_{s,i}} x_a = \sum_{a \in A^{out}_{s,i}} x_a, \forall s \in S, i \in \{1, \ldots, N\} \quad (2)$$

$$\sum_{a \in A^{in}_{0,i}: tail(a) \in S} x_a + \sum_{a \in A^{in}_{0,i}: tail(a)=0} z_a = \sum_{a \in A^{out}_{0,i}} z_a, \quad (3)$$

$$\forall i = 2, \ldots, N$$

$$\sum_{i=1}^{N} \sum_{a \in A^{in}_{0,i}} x_a = 1, \forall s \in S \quad (4)$$

$$C_{lb} \le \sum_{a \in \bigcup_{s \in S} A^{in}_{s,i}} x_a \le C_{ub}, \quad (5)$$

$$x_a \in \{0, 1\}, a \in A(x), a_{z'} \in \mathbb{Z}, \forall a' \in A(z). \quad (6)$$

Z—Set of Integers

N: the number of layers in the decision diagram
$L_i$: represents the i-th layer in the decision diagram, where i=1, . . . , N
s: super-nodes (not including 0-node)
S: set of super-nodes
r,t: the root and terminal nodes in the decision diagram
(s,i) or (0,i): node in layer i of decision diagram
a: arcs in the decision diagram
head(a) (tail(a)): starting (ending) node of the arc in the decision diagram
$A_{s,i}^{in}$ ($A_{s,i}^{out}$): set of input arcs to (output arcs from) super-node s in $L_i$
$A_{0,i}^{in}$ ($A_{0,i}^{out}$): set of input arcs to (output arcs from) 0 in $L_i$
$x_a \in \{0,1\}$ for a $$a \in A(x) := \bigcup_{i=1}^{N} \bigcup_{s \in S} (A^{in}_{s,i} \cup A^{out}_{s,i}):$$

binary variables encoding flow on the arcs between s, s'∈S and flow on arcs between s∈S and 0
$z_a \in \{0, 1, \ldots\}$ for a $$a \in A(z) := \bigcup_{i=2}^{N} A^{out}_{0,i}:$$

integer variables encoding flow on the arcs between 0 in successive layers
$C_{lb}$: the minimum number of circuits
$C_{ub}$: the maximum number of circuits Any feasible solution to the Eq. (2)-Eq. (6) is a feasible circuitry configuration for the heat exchanger. Among the feasible circuity configurations is to find one configuration that optimizes the performance of the heat exchanger. The objective function in the optimization problem is the performance measures that can be considered but not limited to are: (i) maximization (or optimization) of the heat capacity (Q(x; z)), and (ii) maximization of the ratio of the heat capacity to the pressure difference (ΔP(x,z)) across the heat exchanger (Q(x,z)/ΔP(x,z)). These performance measures cannot be typically expressed easily as a function (objective function) of the circuitry configuration. In practice, given a circuitry configuration a simulation using a detailed simulation model is necessary to evaluate the performance measures. As a consequence, the mixed integer programming model in Eq. (1)-Eq. (6) cannot be directly presented to existing mixed integer programming solvers which require the objective to be presented in analytical form. A key realization in the invention is to develop an efficient method to search the space of circuitry configurations and then identify the most promising ones by simulation. The decoupling of these two steps is realized as key to solving this problem.

Figure 7:
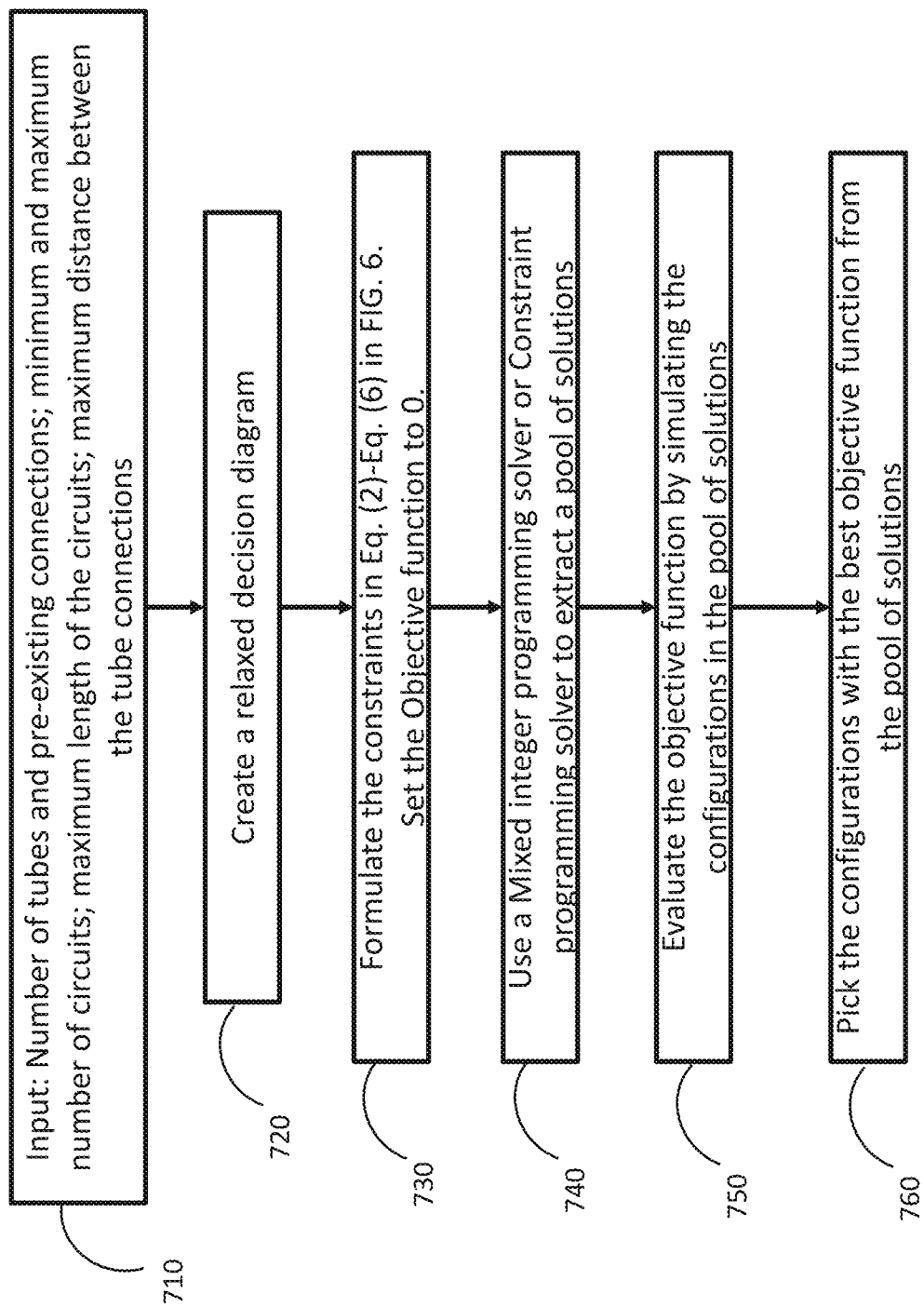
FIG. 7 is a flowchart of the steps involved in the identifying the best configurations according to embodiments of the invention.

FIG. 7 is a depiction of the flowchart that is used to identify feasible circuitry configurations according to embodiments of the invention. The inputs 710 are a number of tubes and pre-existing connections; minimum and maximum number of circuits; maximum length of the circuits; maximum distance between the tube connections. Based on the inputs a relaxed decision diagram 720 is connected according to the descriptions above. The constraints formulating the set of feasible circuitry configurations 730 are formulated as described in Eq. (2)-Eq. (6). The objective is set to 0 730 and the mixed integer programming formulation is presented to the mixed integer programming solver or a constraint programming solver 740 to identify a pool of promising circuitry configurations 740. These set of circuitry configurations are then evaluated using a simulation program (predetermined performance evaluating program) 750 to evaluate the performance measures for each of them. The best circuitry configurations are identified 760 and stored to be presented to the designer.

The existing approaches to modeling the space of circuitry configurations are not efficient, as evidenced in FIG. 8, which presents a table representing the reduction in problem size using the decision diagram formulation as compared to a previous approach for comparison. The significant reduction in the problem size is key to solving large heat exchanger designs. The use of relaxed decision diagram was a key realization in enabling this reduction in problem size.

FIG. 9 presents the performance of the optimized circuitry designs obtained by the embodiments of the inventions against the baseline designs. The embodiments of the invention allow to produce circuitry configurations which greatly improve the performance measures. This is significant improvement that could not be realized without the use of efficient representation such as the relaxed decision diagram that allows sample a large part of the space of circuitry configurations in a short time. In contrast, the previous approach which employed state-of-the-art derivative free optimization algorithms cannot even obtained feasible configurations for large number of tubes or when different constraints are included.

In another embodiment of the invention is disclosed a method for computing the best circuitry configurations by using surrogate models to predict the performance of the circuitry configuration.

Figure 10:
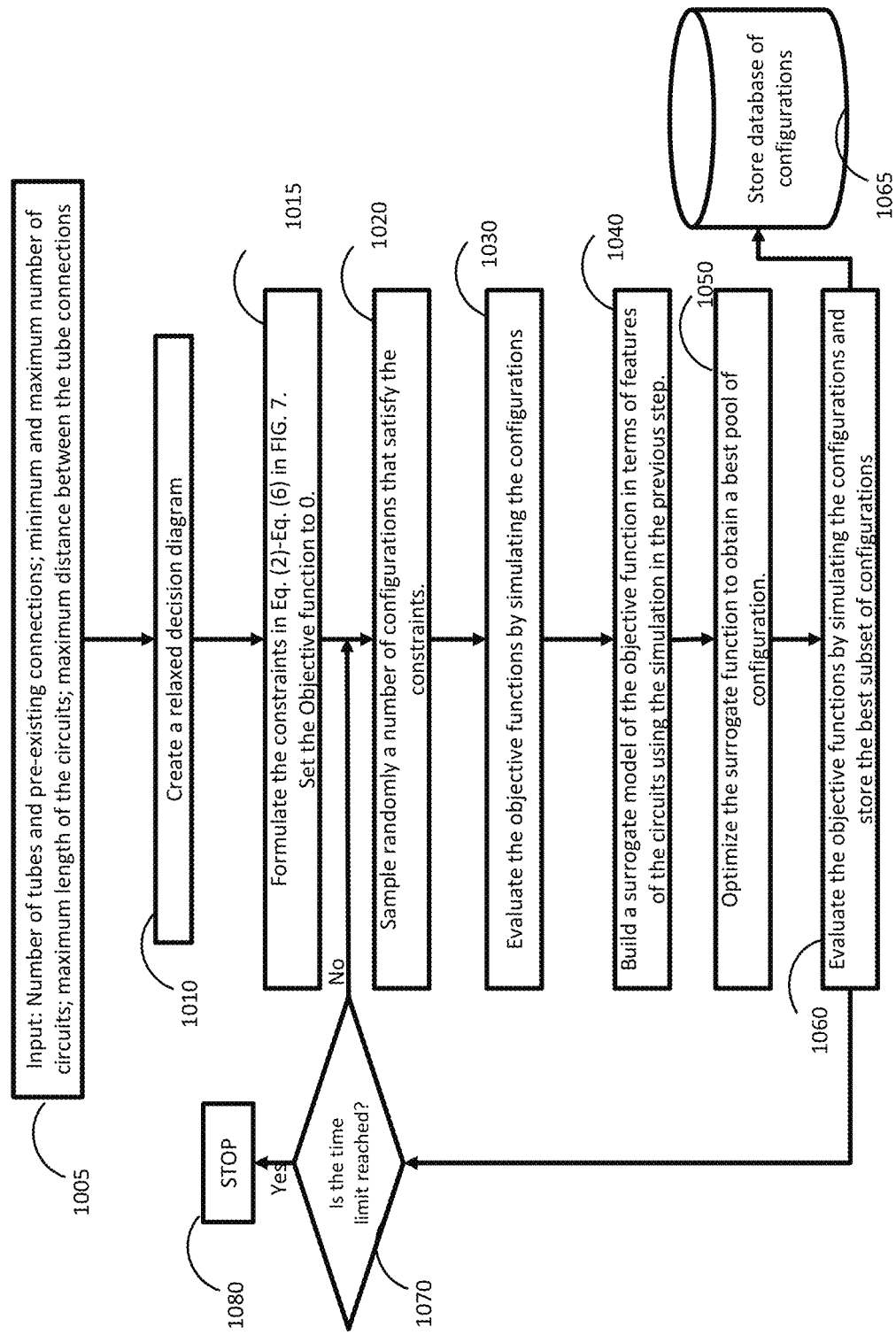
FIG. 10 is a flowchart of the steps involved in the identifying the best configurations according to embodiments of the invention.

FIG. 10 depicts a flowchart of the steps involved in computing the circuitry configurations using the surrogate model method. The method takes as input 1005: Number of tubes and pre-existing connections; minimum and maximum number of circuits; maximum length of the circuits; maximum distance between the tube connections. A relaxed decision diagram is constructed 1010 according to the descriptions disclosed in the invention. The equations Eq. (2)-Eq. (6) modeling the set of feasible configurations are formulated 1015. The method first samples a number of feasible circuitry configurations 1020. In one embodiment of the invention the sampling is performed by running a mixed integer programming algorithm or constraint programming algorithm to identify a pool of feasible solutions as described in the algorithm in FIG. 7. In another embodiment of the invention, the circuitry configurations are sampled in a constructive manner. Such a constructive algorithm is disclosed in FIG. 12.

Given a sample of circuitry configurations, the simulation is performed on these configurations to evaluate the performance measures 1030. In one embodiment of the invention the configurations are evaluated in parallel using a cluster of computing nodes or a multicore processor. This is essential to decrease the computational time for the entire algorithm.

From the circuitry configurations the features of the circuitry configurations are identified. In one embodiment of the invention the features of the circuitry configuration include:
Number of circuits
Length of circuits
Distance of connected tubes
Number of crossovers between columns
Location of inlet tubes
Location of outlet tubes.

Using these identified features for each configuration and the performance measure a surrogate model is constructed 1040.

A surrogate model is constructed using the features of the available circuitry configurations and the evaluated performance measures. In one embodiment of the invention a surrogate model can be a support vector machine where in a linear kernel is used or a nonlinear kernel such as a radial basis function is used. In another embodiment of the invention a neural network is used to obtain the surrogate model.

The surrogate model is optimized in two stages 1050. In the first stage, an optimization model with the surrogate model as the objective function and a set of bound constraints in order to avoid extreme solutions, e.g., set distance constraints to the connected tubes. This optimization model is a mixed integer nonlinear programming model. FIG. 14 presents the mixed integer nonlinear programming model derived from first stage. Constraint (2) in FIG. 14 sets limits to the number of circuits, while constraint (3) sets limits to the length of circuits. Constraint (4) in FIG. 14 sets an upper limit to the distanced of connected tubes, while constraint (5) sets limits to the number of crossovers between columns.

This optimization is used to identify a pool of solutions that describe solutions with specific features, e.g., number of circuits>=4, length of circuits>=10, distance of connected tubes<=5, etc. In the second stage, for each of these solutions, a mixed integer programming that has the constraints Eq. (2)-Eq. (6) and also includes the additional constraints that are selected from the first stage optimization model. For example, if in the first stage optimization is performed with the following constraints:
number of circuits>=4
length of circuits>=10
distance of connected tubes<=5.

The above constraints are included in the second stage optimization model to reduce the original search space. The key realization is that this makes the second stage model easier to solve. A pool of solutions, which are now circuitry configurations, are obtained by solving the second stage optimization problem.

The obtained circuitry configurations from the second stage are evaluated 1060 using the simulator and stored in a database of solution 1065. The procedure of building a different surrogate model and optimizing continues until a time limit is reached 1070.

Figure 11:
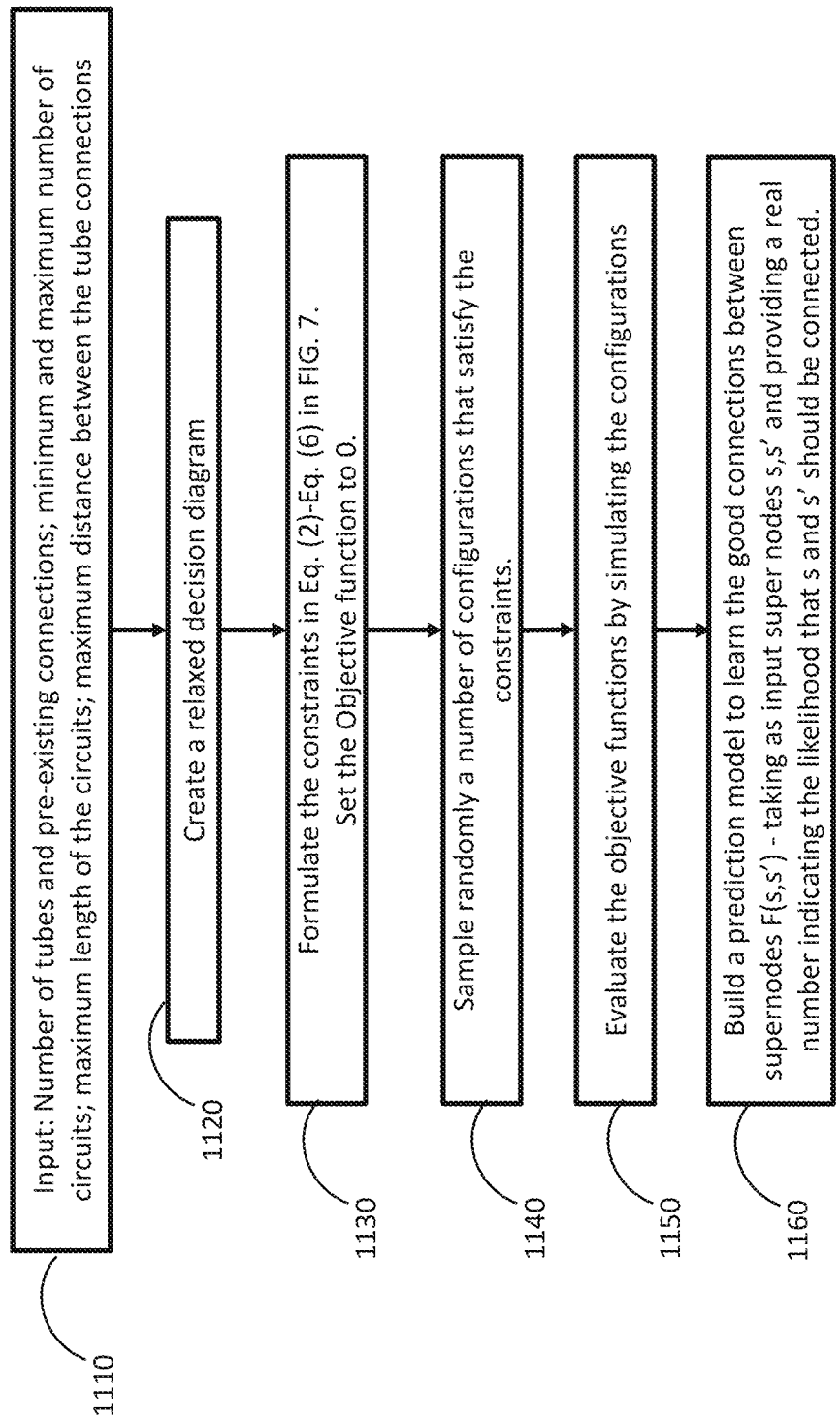
FIG. 11 is a flowchart of the steps involved in learning a prediction model for identifying the best connection between supernodes in relaxed decision diagrams according to embodiments of the invention.

In another embodiment of the invention a method is disclosed for computing the best circuitry configurations by using prediction models to predict the next super-node to include in the circuit as part of the circuitry configuration. FIG. 11 depicts a flowchart of the steps involved in computing the prediction model F(s,s') which taking as input super nodes s,s' and providing a real number between 0 and 1 indicating the likelihood that s and s' should be connected. The method takes as input 1110: Number of tubes and pre-existing connections; minimum and maximum number of circuits; maximum length of the circuits; maximum distance between the tube connections. A relaxed decision diagram is constructed 1120 according to the descriptions disclosed in the invention. The equations Eq. (2)-Eq. (6) modeling the set of feasible configurations are formulated 1130. The method first samples a number of feasible circuitry configurations 1140. In one embodiment of the invention the sampling is performed by running a mixed integer programming algorithm or constraint programming algorithm to identify a pool of feasible solutions as described in the algorithm in FIG. 7. In another embodiment of the invention, the circuitry configurations are sampled in a constructive manner. Such a constructive algorithm is disclosed in FIG. 12, which provides a flowchart of the steps involved in identifying the best configurations according to embodiments of the invention.

Given a sample of circuitry configurations, the simulation is performed on these configurations to evaluate the performance measures 1140. In one embodiment of the invention the configurations are evaluated in parallel using a cluster of computing nodes or a multicore processor. This is essential to decrease the computational time for the entire algorithm.

A prediction model is constructed 1160 using the circuits and the resulting performance measures. The prediction model predicts F(s,s') which takes as input super nodes s,s' and providing a real number between 0 and 1 indicating the likelihood that s and s' should be connected. In one embodiment of the invention such a prediction model can be obtained using the neural networks and reinforcement learning on graphical models as outlined in Michel Deudon, Pierre Cournut, Alexandre Lacoste, Yossiri Adulyasak, and Louis-Martin Rousseau, Learning Heuristics for the TSP by Policy Gradient, International Conference on the Integration of Constraint Programming, Artificial Intelligence, and Operations Research CPAIOR 2018: Integration of Constraint Programming, Artificial Intelligence, and Operations Research pp 170-181.

Figure 12:
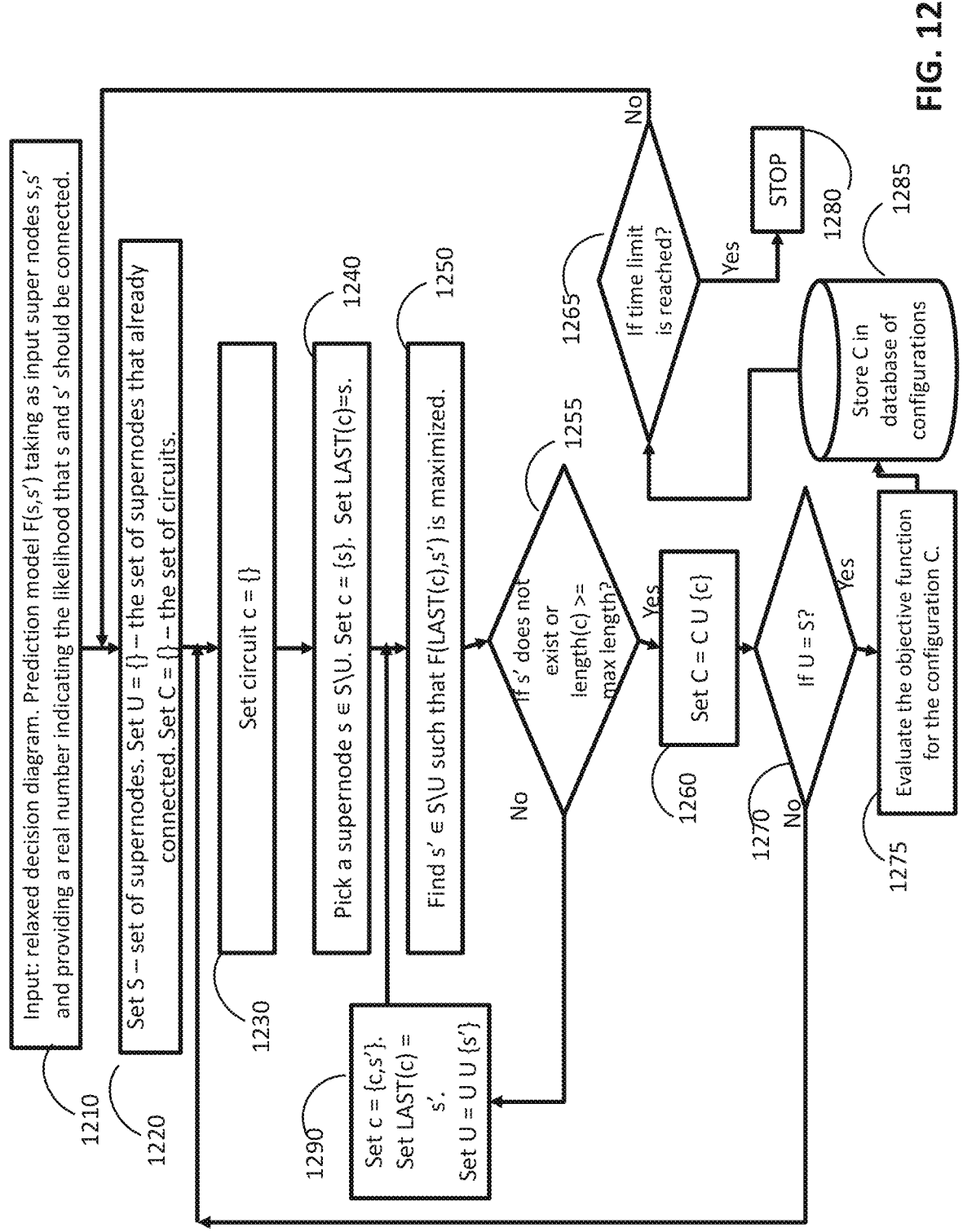
FIG. 12 is a flowchart of the steps involved in identifying the best configurations according to embodiments of the invention.

Using the prediction model F(s,s') the circuitry configurations are identified as described in the flowchart in FIG. 12. The method for identifying the circuitry configurations takes as input 1210 the relaxed decision diagram, and the prediction model F(s,s') taking as input super nodes s,s' and providing a real number between 0 and 1 indicating the likelihood that s and s' should be connected. The method initialized certain quantities 1220: Set S—set of supernodes, U={ }—the set of supernodes that already connected, and C={ }—the set of circuits. The method proceeds by first setting the circuit c={ } to be empty 1230. The method incrementally adds super-nodes to the circuit. The method first picks a supernode in the circuit that is empty 1240. The super-node is denoted as LAST(c) to identify this as the super-node to which the next super-node should be connected. The next super-node to be connected to LAST(c) is identified using the prediction model F(s,s') 1250. This super-node is added to circuit c 1290 provided such a candidate is available and the maximum length of the circuit is not reached and the distance constraints are not violated 1255. If additional super-nodes cannot be added then the method stores the current circuit in C 1260 and proceeds to identify the next circuit by repeating the steps outlined above provided not all super-nodes have already been connected 1270. If all the super-nodes have been connected then the set of circuits that define the identified circuity configuration are stored in a database 1285 after evaluating the circuitry using a simulator 1275. The method proceeds to identify the next circuitry configuration so long as the computational time budget is not exceeded 1265.

FIG. 13 is a table depicting the reduction in computational time over a commercial mixed integer programming solver according to embodiments of the invention. The figure shows a substantial effective reduction in the solution time that can be obtained from using the embodiments of the invention to identify new circuitry configurations over mixed integer programming solver CPLEX.

FIG. 14 is the optimization formulation used in conjunction with surrogate models according to embodiments of the invention. Constraint (2) in FIG. 14 sets limits to the number of circuits, while constraint (3) sets limits to the length of circuits. Constraint (4) in FIG. 14 sets an upper limit to the distanced of connected tubes, while constraint (5) sets limits to the number of crossovers between columns.

This optimization is used to identify a pool of solutions that describe solutions with specific features, e.g., number of circuits>=4, length of circuits>=10, distance of connected tubes<=5, etc. In the second stage, for each of these solutions, a mixed integer programming that has the constraints Eq. (2)-Eq. (6) and also includes the additional constraints that are selected from the first stage optimization model. For example, if in the first stage optimization is performed with the following constraints:
number of circuits>=4
length of circuits>=10
distance of connected tubes<=5.

The above constraints are included in the second stage optimization model to reduce the original search space.

Figure 15:
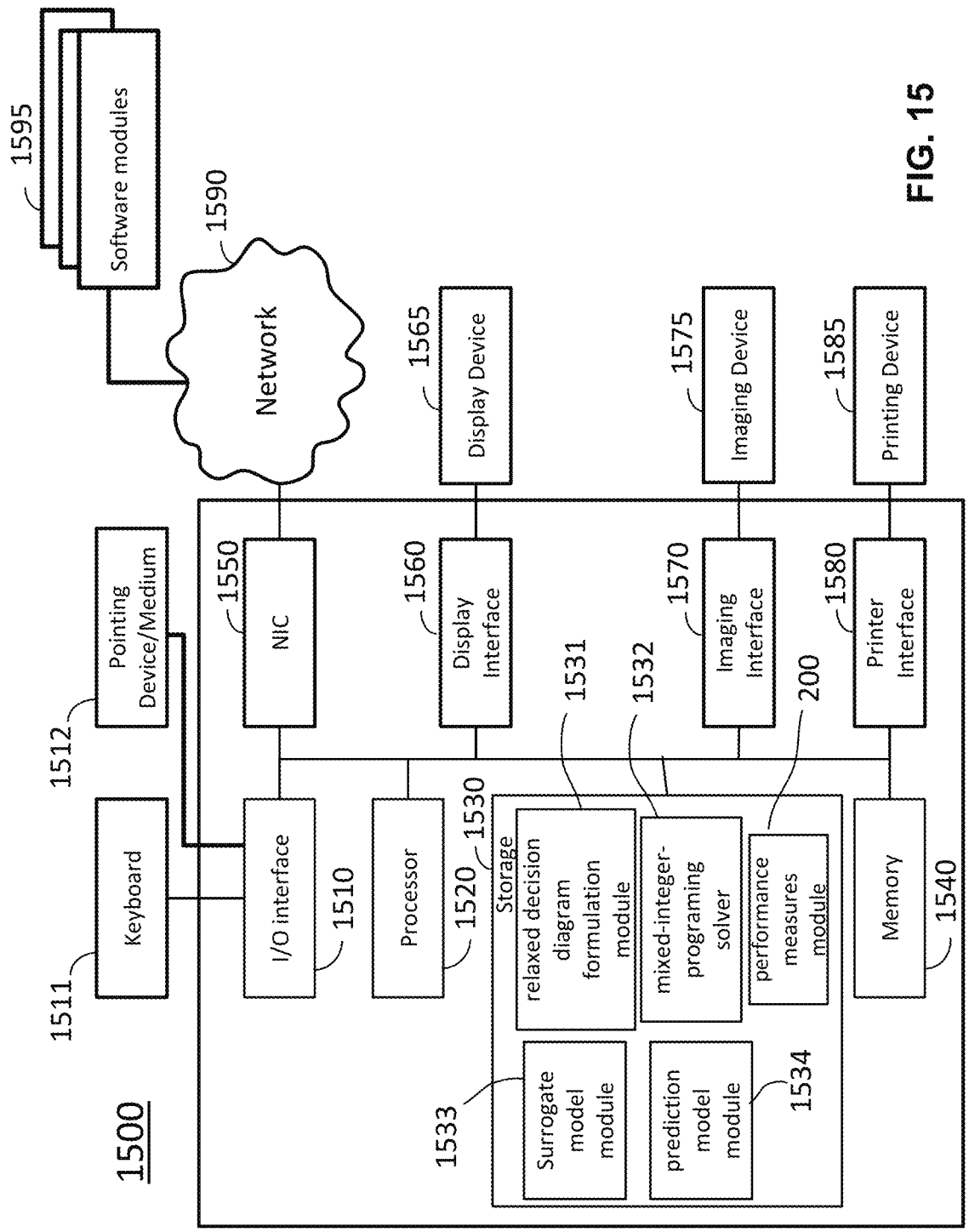
FIG. 15 is a block diagram of a designing system for designing a circuitry configuration of heat-exchanger units, according to embodiments of the present invention.

FIG. 15 shows a block diagram of a designing system 1500 for a circuitry configuration of heat-exchanger units according to some embodiments of the invention. The system 1500 includes an input/output interface (I/O interface) 1510 connectable with a keyboard 1511 and a pointing device/medium 1512, a processor 1520, a storage device 1530, a memory 1540, a network interface controller 1550 (NIC) connectable with a network 1590 including local area networks and internet network, a display interface 1560, an imaging interface 1570 connectable with an imaging device 1575, a printer interface 1580 connectable with a printing device 1585. The designing system 1500 can receive design parameters of heat-exchanger units and outputs the corresponding feasible configurations via the network 1590 connected to the NIC 1550.

The storage device 1530 may include computer-executable programs, which include a relaxed decision diagram formulation module 1531, a mixed-integer-programming solver 1532, a surrogate model module 1533, a prediction model module 1534, and a performance measures module 200. In some cases, mixed-integer-programing solvers 1532 and performance measures modules 200 may be arranged in outside servers (cloud servers) 1595 that receives the feasible configurations to solve predetermined objective functions with respect to the feasible configurations of the heat-exchanger units and evaluates the performances of the configurations. Further, the solutions obtained by executing the mixed-integer-programing solvers 1532 and performance measures modules 200 using the outside servers 1595 can be received via the NIC 1550 for outputting a circuitry configuration of heat-exchanger units according to the design parameters of the heat-exchanger units.

The pointing device/medium 1512 may include modules that read programs stored on a computer readable recording medium.

For designing a circuitry configuration of heat-exchanger units, instructions may be transmitted to the system 1500 using the keyboard 1511, the pointing device/medium 1512 or via the network 1590 connected to other computers or servers (not shown in the figure). The system 1500 receives the instructions using the I/O interface 1510 and executes the instructions for designing a circuitry configurations of heat-exchanger units using the processor 1520 performing the computer-executable programs stored in the storage device 1530. The processor 1520 may be a plurality of processors including one or more than graphics processing units (GPUs).

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the objective of the appended claims to cover all such variations and modifications as come within the true spirit and scope of the invention.

The invention claimed is:

1. A system for designing a circuitry configuration of heat-exchanger units, comprising:
an interface to acquire design parameters of the heat-exchanger units, wherein the design parameters include a number of tubes and a number of pre-existing connections, minimum and maximum number of circuits, a maximum length of the circuits, a maximum distance between connections of the tubes;
a memory to store the design parameters, a set of configurations of heat-exchanger units and computer-executable programs including a relaxed decision diagram formation module;
a processor, in connection with the memory, configured to perform steps according to the computer-executable programs, wherein the steps comprising:
generating a relaxed decision diagram for each of the heat-exchanger units based on the design parameters of the heat-exchanger units by executing the relaxed decision diagram formation module, wherein the relaxed decision diagram defines pre-connected tubes as supernodes treated as one heat-exchanger unit;
creating constraints with respect to connections of the heat-exchanger units according to the relaxed decision diagram, wherein the constraints include location of inlet tubes and location of outlet tubes; and
generating feasible configurations of the heat-exchanger units by using the constraints.

2. The system of claim 1, wherein each of the heat-exchanger units is formed of a tube that includes a supernode corresponding to a bend on a far end of the tube.

3. The system of claim 1, further comprising:
providing an objective function that represents a heat capacity of the heat-exchanger units or a ratio of a heat capacity to a pressure difference across the circuitry configuration of the heat exchanger units.

4. The system of claim 2, wherein the constraints, with respect to connections of the heat-exchanger units, include
(i) adjacent pairs of the heat-exchanger units in each column, starting with a bottom unit among the heat-exchanger units, are connected,
(ii) the connections on a far end of the heat-exchanger units cannot cross rows unless the heat-exchanger units are at the edge of the coil,
(iii) all the heat-exchanger units in the heat exchanger must be connected,
(iv) inlets and outlets of the heat-exchanger units must be located at a near end, and
(v) merges and splits of the heat-exchanger units are not allowed.

5. The system of claim 1, further comprising:
applying the feasible configurations of the heat-exchanger units to a predetermined performance evaluating program for each of the feasible configurations.

6. The system of claim 1, further comprising:
applying a set of samples of the feasible configurations to a predetermined performance evaluating program;
building a surrogate model optimization problem using features of the feasible configurations, creating surrogate model constraints for the surrogate model according to the design parameters; and
solving the surrogate model optimization problem.

7. The system of claim 6, wherein a prediction model, which takes as input a pair of supernodes and returns a real number between 0 and 1 indicating a likelihood that given supernodes should be connected, is used to identify a set of samples of the feasible configurations to a predetermined evaluating program.

8. The system of claim 6, wherein the prediction model iteratively identifies the next node to connect to the circuit.

9. The system of claim 6, wherein the prediction model is constructed using neural networks or reinforcement learning on graphical models.

10. The system of claim 1, further comprising:
applying a set of samples of these feasible configurations to a predetermined performance evaluating program,
building a surrogate model using features of these configurations,
creating constraints for the surrogate model according to the design parameters,
solving the surrogate model optimization problem,
applying the results of the surrogate model optimization to a predetermined performance evaluating program,
storing a subset of these configurations in a database of solutions, and
repeating this process for different sample sets of feasible configurations until a time limit is reached.

11. The system of claim 10, wherein each of the heat-exchanger units is formed of a tube that includes a supernode corresponding to a bend on a far end of the tube.

12. The system of claim 10, further comprising:
providing an objective function that represents a heat capacity of the heat-exchanger units or a ratio of a heat capacity to a pressure difference across the circuitry configuration of the heat exchanger units.

13. The system of claim 10, wherein the constraints, with respect to connections of the heat-exchanger units, include
(i) adjacent pairs of the heat-exchanger units in each column, starting with a bottom unit among the heat-exchanger units, are connected,
(ii) the connections on a far end of the heat-exchanger units cannot cross rows unless the heat-exchanger units are at the edge of the coil,
(iii) all the heat-exchanger units in the heat exchanger must be connected,
(iv) inlets and outlets of the heat-exchanger units must be located at a near end, and
(v) merges and splits of the heat-exchanger units are not allowed.

14. The system of claim 10, further comprising
applying the feasible configurations of the heat-exchanger units to a predetermined performance evaluating program for each of the feasible configurations.

15. The system of claim 10, further comprising
applying the feasible configurations of the heat-exchanger units to a set of predetermined performance evaluating programs for each of the feasible configurations is accomplish concurrently via parallel computation.

16. The system of claim 10, wherein the features of these configurations, with respect to connections of the heat-exchanger units, include
the number of parallel paths resulting from the interconnections of subsets of heat-exchanger units,
the total number of heat-exchanger units included in a given path,
the distance between the heat-exchanger units that are connected,
the number of traversals across the columns of a limit on number of crossovers between columns,
the location of inlet tubes, and
the location of outlet tubes.

17. The system of claim 10, wherein the surrogate model consists of a support vector machine or a set of radial basis functions.

18. The system of claim 10, wherein the surrogate model optimization problem is solved in two stages that comprises
applying a set of bound constraints and solving the surrogate model optimization problem with a mixed-integer nonlinear programming method, and applying a set of design parameter constraints to the results of this first stage and then solving this optimization problem with a mixed-integer nonlinear programming method.

19. The system of claim 10, wherein the surrogate model optimization problem is solved constructively by evaluating a real number indicating the likelihood that given pairs of heat-exchanger units should be connected.

20. The system of claim 19, wherein the constructive solution method for the surrogate model optimization problem iteratively identifies the next node to connect to the circuit.

21. A computer-implemented method for designing a circuitry configuration of heat-exchanger units, comprising steps of:
  acquiring design parameters of the heat-exchanger units, wherein the design parameters include a number of tubes and a number of pre-existing connections, minimum and maximum number of circuits, a maximum length of the circuits, a maximum distance between connections of the tubes;
  generating a relaxed decision diagram for each of the heat-exchanger units based on the design parameters of the heat-exchanger units by executing the relaxed decision diagram formation module, wherein the relaxed decision diagram defines pre-connected tubes as supernodes treated as one heat-exchanger unit;
  creating constraints with respect to connections of the heat-exchanger units according to the relaxed decision diagram, wherein the constraints include location of inlet tubes and location of outlet tubes; and
  generating feasible configurations of the heat-exchanger units by using the constraints.

22. The method of claim 21, wherein each of the heat-exchanger units is formed of a tube that includes a supernode corresponding to a bend on a far end of the tube.

23. The method of claim 21, further comprising:
  providing an objective function that represents a heat capacity of the heat-exchanger units or a ratio of a heat capacity to a pressure difference across the circuitry configuration of the heat exchanger units.

24. The method of claim 22, wherein the constraints, with respect to connections of the heat-exchanger units, include
  (i) adjacent pairs of the heat-exchanger units in each column, starting with a bottom unit among the heat-exchanger units, are connected,
  (ii) the connections on a far end of the heat-exchanger units cannot cross rows unless the heat-exchanger units are at the edge of the coil,
  (iii) all the heat-exchanger units in the heat exchanger must be connected,
  (iv) inlets and outlets of the heat-exchanger units must be located at a near end, and
  (v) merges and splits of the heat-exchanger units are not allowed.

25. The method of claim 21, further comprising:
  applying the feasible configurations of the heat-exchanger units to a predetermined performance evaluating program for each of the feasible configurations.

* * * * *